United States Patent [19]
Ishii et al.

[11] Patent Number: 4,783,686
[45] Date of Patent: Nov. 8, 1988

[54] MICROCAMERA

[75] Inventors: Kenjiro Ishii; Fumio Fukumoto, both of Sagamihara; Akira Shibata, Yokohama; Eiichi Uchijima; Shizuo Suzuki, both of Tokyo, all of Japan

[73] Assignee: Minolta Camera Kabushiki Kaisha, Osaka, Japan

[21] Appl. No.: 51,645

[22] Filed: May 20, 1987

[30] Foreign Application Priority Data

May 21, 1986 [JP] Japan .................... 61-116744
Nov. 27, 1986 [JP] Japan .................... 61-283960

[51] Int. Cl.$^4$ .................... G03B 27/32; G03B 27/52
[52] U.S. Cl. .................... 355/64; 355/74
[58] Field of Search .............. 355/27, 50, 64, 71, 355/74

[56] References Cited

U.S. PATENT DOCUMENTS 2,748,651 6/1956 Simjian .................... 355/64
3,669,539 6/1972 Okuyama .................... 355/64
4,259,007 3/1981 Arai et al. .................... 355/27

FOREIGN PATENT DOCUMENTS 59-83137 5/1984 Japan.

Primary Examiner—Richard A. Wintercorn
Attorney, Agent, or Firm—Burns, Doane, Swecker & Mathis

[57] ABSTRACT

A microcamera for photographing the image of an original document on a film, with an aperture for determining a photographing area. The size of the aperture is variable in accordance with a document size by moving an end edge of the aperture adjacent a film supply reel with an end edge thereof adjacent to a film takeup reel fixed. Aperture size variations effected in this manner is free from superposition of an image on a preceding image when the photographing area is enlarged from half size to full size, for example. Conversely, when the photographing area is reduced from fullsize to half size, a space between adjacent images may be the same as when the photographing area is not reduced.

12 Claims, 7 Drawing Sheets

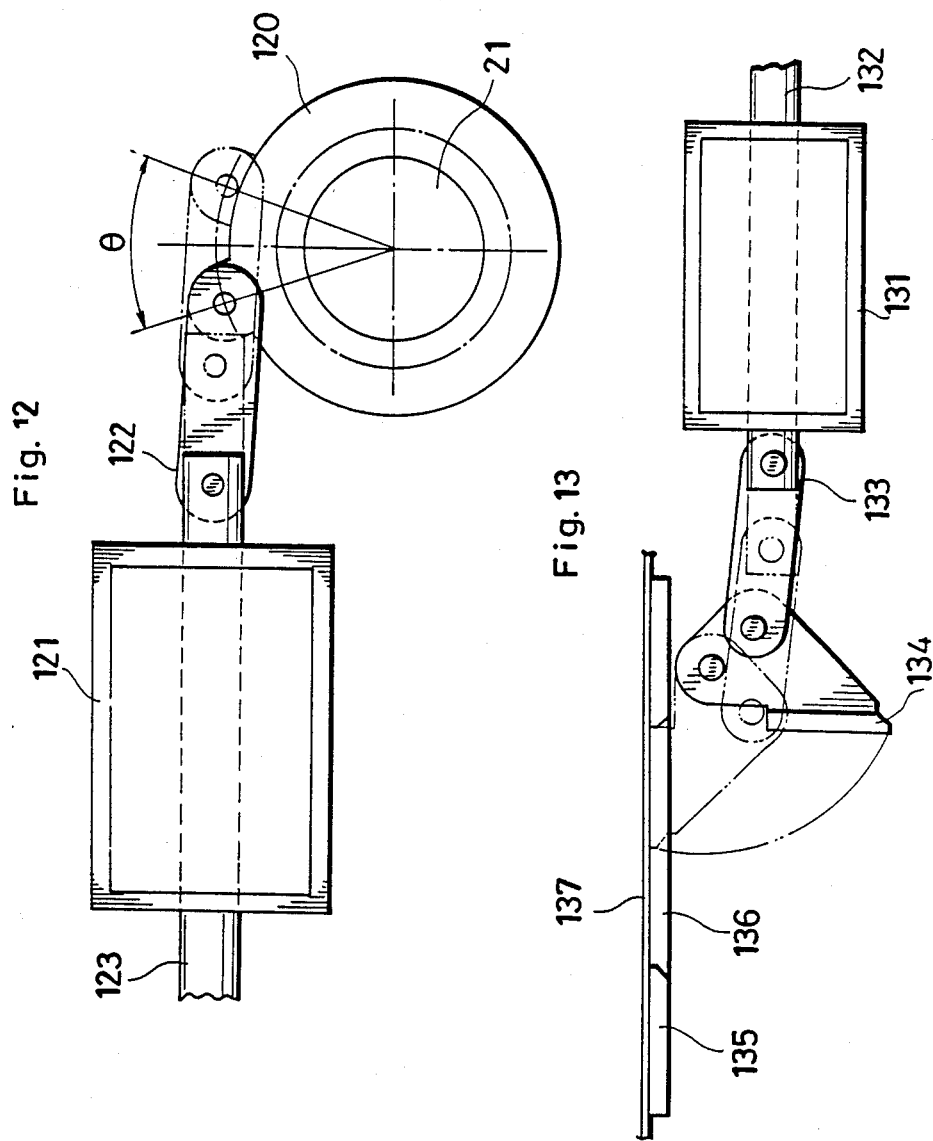

MICROCAMERA

BACKGROUND OF THE INVENTION (1) Field of the Invention

The present invention relates to a microcamera, and more particularly to a microfilm camera for photographing the images of original documents on reduced scales on films.

(2) Description of the Prior Art

The microcamera has been in existence heretofore as a device for preparing microfilms for use in information retrieval by a reader-printer or the like.

The preparation of microfilms by means of the microcamera involves various sizes of original documents to be photographed such as A3 size and A4 size. Take a 35 mm wide film for example, the half-size frame is standardized to be 31.8 mm×22.5 mm and the full-size frame 31.8 mm×45 mm. In one method of photographing the original documents in various sizes, the sizes of frames in the film are switched between half size (referenced A) and full size (referenced B) as shown in FIG. 1 of the accompanying drawings. The conventional method in which the frame sizes are switched as above is carried out by providing an aperture member on a projecting optical path extending from the original document to the film for setting a photographing area on the film, which member has opposite ends defining an aperture in the direction of film advance, and moving these opposite ends toward each other (in directions to close the aperture) and away from each other (in directions to open the aperture) in accordance with the orginal document sizes. The opposite ends of the aperture are moved toward each other for setting the photographing area to the half size and away from each other for setting the photographing area to the full size.

However, the above method has the following problems. Firstly, since the opposite ends of the aperture are moved, an end of the original document cannot be used as the basis for setting the original document in position on an original board. Therefore, only the centerline of the original document remains available as the basis for position setting. It is then necessary to determine the centerline of the original document in advance, which results in a very troublesome position setting step. In the case of a microcamera having an autofeed mechanism for advancing the original document particularly, there arises the problem of requiring a complicated construction for detecting and setting the original document and a troublesome control operation.

Secondly, since the opposite ends of the aperture are moved away from each other when photographing an A3 size document after an A4 size document, the image of the A3 size document could be superposed on the image of the A4 size document on an exposed portion of the film. In order to avoid this inconvenience, the film must be further advanced in an additional step by an adequate length to prevent the double exposure on the exposed portion of the film. This additional step is taken separately from a film advance operation carried out every time the original document is changed. However, such a film advance control is troublesome and requires a complicated construction.

Thirdly, since the opposite ends of the aperture are moved toward each other when photographing an A4 size document after an A3 size document, too large a blank space is formed between the image of the A3 size document and that of the A4 size document on the exposed portion of the film. The film must be moved backward to avoid this inconvenience and provide an appropriate blank space. Such an operation involves a troublesome control and a complicated construction as noted in connection with the second problem above.

SUMMARY OF THE INVENTION

A primary object of the present invention, therefore, is to provide a microcamera which realizes photographing areas of suitable sizes in accordance with the original document sizes without moving both ends of the aperture.

Another object of the invention is to provide a microcamera capable of avoiding the double exposure due to an enlargement of the photographing area.

A further object of the invention is to provide a microcamera capable of forming an appropriate blank space between two images when the photographing area is reduced.

A still further object of the invention is to provide a microcamera of simple construction in which an additional film advancing or backing control is not required when the photographing area is enlarged or reduced.

A still further object of the invention is to provide a microcamera which permits the original document always to be set in position on an original board by using an end of the document as the basis even when the photographing area is varied.

These and other objects of the invention are fulfilled by a microcamera comprising an original board for supporting an original document; a supply reel for supplying a film to be used for recording an image of the original document; a takeup reel for taking up the film on which the image of the original document is recorded; optical means for projecting the image of the original document on a reduced scale to the film extending between the supply reel and the takeup reel; setting means, disposed on a projecting optical path between the original board and the film, for defining an image area of the original document projected on the film by the optical means; and varying means for varying a width, in a direction of movement of the film, of the image area defined on the film by the setting means, the varying means being operable to vary the width by taking an end of the area adjacent the takeup reel for reference with an end of the area adjacent the supply reel varied.

The setting means may comprise a member defining an aperture, for example. Then the varying means comprises a movable member movable between a position to cover a portion of the aperture and a position retracted from the aperture, and means for moving the movable member.

According to the above construction, the photographing area on the film is variable by moving only one end of the aperture in a direction of film advance or in a direction opposite thereto with the other end thereof fixed. Therefore, this construction is simpler than in the prior art in which both ends of the aperture are moved.

Besides, since the movable end of the aperture is disposed adjacent the film supply reel with the end thereof adjacent the film takeup reel fixed, a double exposure is effectively avoided without an additional film feeding step when a large document is photographed after a small document, and a suitable blank space is secured between two images without rewinding the film when a small document is photographed after a large document. Thus, the construction is simplified by this feature also, which has the advantages of low cost, easiness of control, and short processing time.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:-

FIG. 12 is a schematic plan view of a mechanism for switching photographic magnification, FIG. 13 is a schematic side view of a modified embodiment for varying an opening amount of the aperture.

DESCRIPTION OF THE PREFERRED EMBODIMENT

Figure 1:
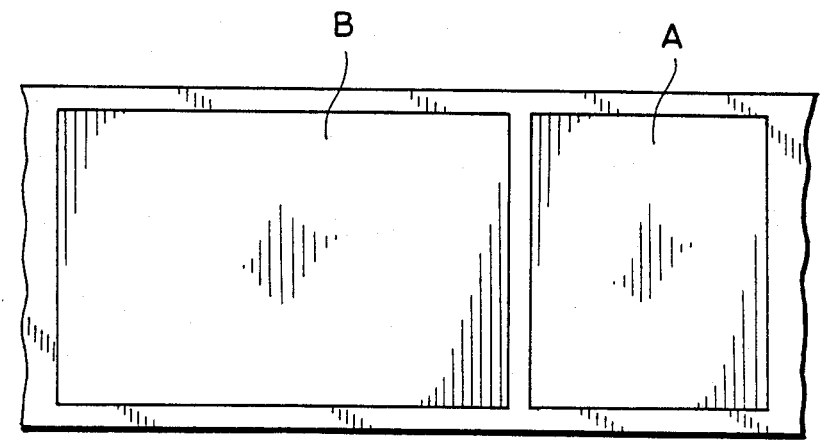
FIG. 1 is a view showing examples of photographing area dimensions for half-size and full-size film frames.
Figure 2:
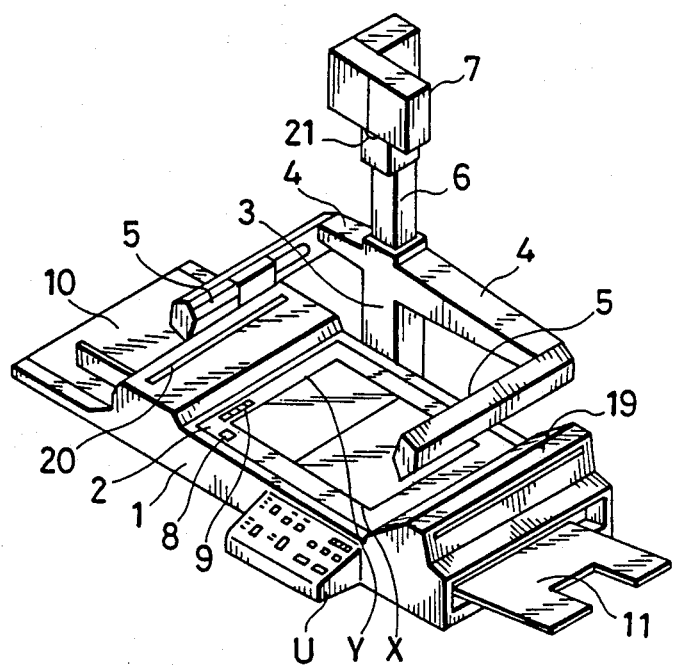
FIG. 2 is a perspective view of an automatic microcamera embodying the present invention.
Figure 3:
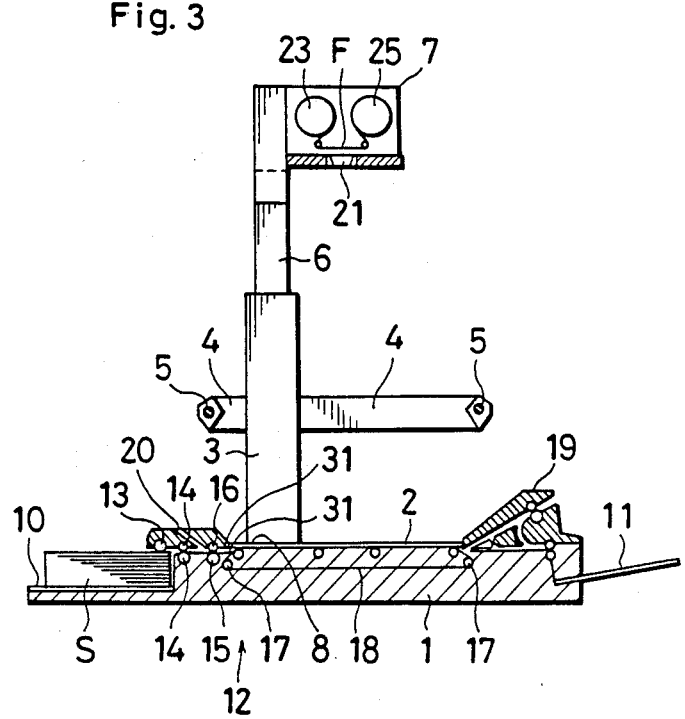
FIG. 3 is a sectional view of the microcamera shown in FIG. 2.

FIG. 2 is a perspective view of an automatic microcamera as one example of embodiment of this invention. FIG. 3 shows a section of this microcamera. As seen, the microcamera comprises a base 1, a rectangular original board 2 fixed to the base 1, and a stationary prop 3 in rectangular pipe form erected at a long side of the base 1. The stationary prop 3 includes a pair of arms 4 extending sideways and each carrying a light source 5 such as an illuminating lamp attached to a distal end thereof. Each light source 5 is opposed to the original board 2 to emit illuminating light to the original board 2. The stationary prop 3 receives a vertically movable prop 6 through an upper end thereof. The movable prop 6 carries a camera head 7 attached to a distal end thereof. Reference U indicates a control unit provided at the other long side of the base 1. There are a feed tray 10 at one short side of the base 1 for feeding original documents S and a discharge tray 11 at the other short side thereof for receiving the orginal documents S. Number 12 indicates an autofeed mechanism for transporting the original documents S from the feed tray 10 to the original board 2 and out to the discharge tray 11. The autofeed mechanism 12 includes a pickup roller 13 rotatable in pressure contact with the original documents S on the feed tray 10, a pair of nip rollers 14 for regulating the documents S fed by the pickup roller 13 to transport the documents forward one by one, a feed roller 15 rotatable to receive the documents from the nip rollers 14 one by one and transport them further forward, an auxiliary roller 16 opposed to the feed roller 15, and a conveyor belt 18 wound around a pair of conveying rollers 17 for transporting the documents S along the original board 2 toward the discharge tray 11. The conveyor belt 18 may be stopped during the document transporting operation as desired. The autofeed mechanism 12 further includes a reversing section 19 for turning over the documents S having one surface thereof photographed and feeding the documents S back to the original board 2, and a manual inserting inlet 20 for enabling the documents S to be manually fed to the feed roller 15.

Figure 4:
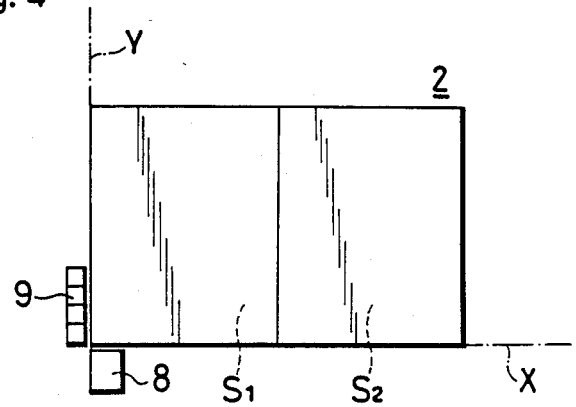
FIG. 4 is a plan view of an original board.
Figure 5:
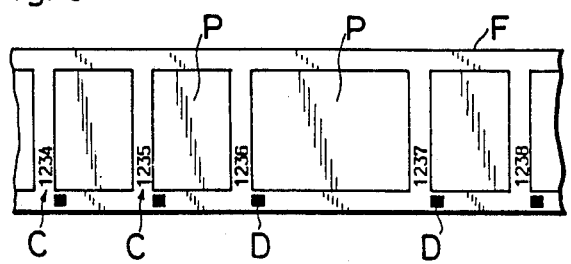
FIG. 5 is a view showing a microfilm.

As shown in FIGS. 2 and 4, the original board 2 defines a line X extending longitudinally and a line Y extending transversely thereof and acting as position setting lines for original documents S1 and S2, a recording section 8 disposed alongside the line X for recording document marks D (FIG. 5), and a recording section 9 disposed alongside the line Y for recording frame numbers C (FIG. 5). The document marks D comprise blip marks of any of the various types recorded in a channel portion adjacent images. The recording section 8 for recording the document marks D comprises a light emitting diode or the like. Each frame number C consists of a four digit number, for example, which is recorded between images P when each original document S is photographed on a film F. The recording section 9 for recording the frame numbers C comprises a light emitting diode or the like.

Figure 6:
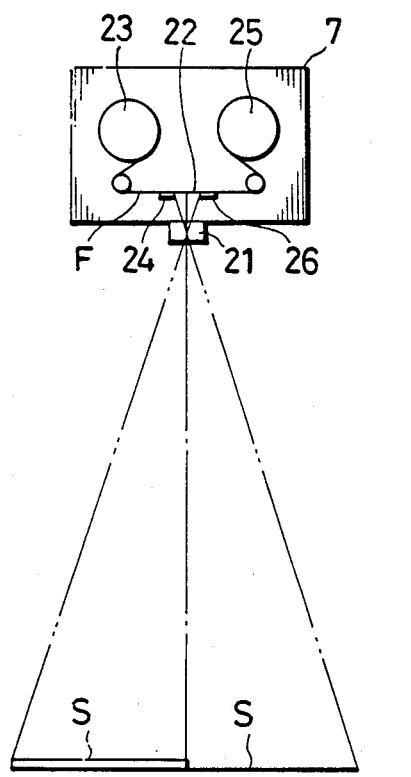
FIG. 6 is a schematic view of a camera head.

The camera head 7 has a closed box-like construction including a lens 21 mounted in a bottom opening thereof as shown in FIGS. 3 and 6. The camera head 7 houses a shutter (not shown) and a device for defining an aperture 22 opposed to the lens 21. The film F which is wound around a supply reel 23 and a takeup reel 25 extends through a position directly over the aperture 22. The film F is exposed to the light emitted from the light sources 5 for illuminating the document S on the original board 2, reflected by the document S, and entering the camera head 7 through the shutter in an open position and the aperture 22. The lens 21 determines a photographing magnification.

In this embodiment, the photographing magnification is variable by operating a magnification switching mechanism shown in FIG. 12 to move the lens 21 toward or away from the film F. The magnification switching mechanism of FIG. 12 comprises a focusing helicoid 12 including an outer cylindrical element and an inner cylindrical element. The outer element is rotatable to move the inner element in directions perpendicular to the document S. The lens 21 is mounted in the inner element. Number 121 indicates a latching solenoid connected to the focusing helicoid 120 through a connecting lever 122 and a plunger 123 movable right and left in the drawing. The solenoid 121, when electrified, drives the plunger 123 to rotate the focusing helicoid 120 a predetermined angle $\theta$, which moves the lens 21 along an optical axis thereby varying the photographing magnification. The latching solenoid 121 may be electrified only when varying the photographing magnification; after power is cut off upon completion of the switching operation the latching solenoid 121 remains in the position it assumes with the electrification. The latching solenoid 121 may be the three position stabilizing type instead of two, in which case the photographing magnification is variable in three steps.

Figure 7:
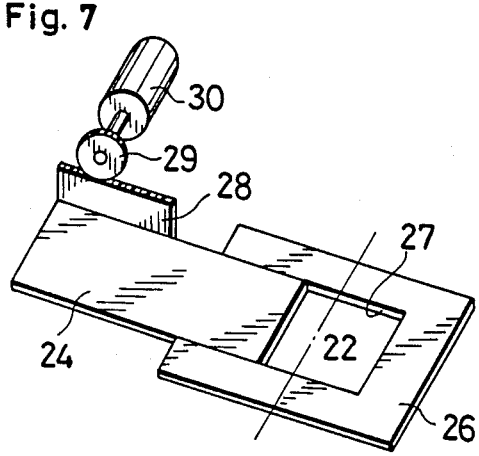
FIG. 7 is a view showing an aperture and adjacent elements.

The device for defining the aperture 22 includes a movable plate 24 for defining an end of the aperture 22 opposed to an unexposed side of the film F which is adjacent the supply reel 23, and a stationary plate 26 defining the other, fixed end of the aperture 22 opposed to an exposed side of the film F which is adjacent the takeup reel 25. As shown in FIG. 7, the movable plate 24 is slidable along lateral edges 27 of the aperture 22 defined by the stationary plate 26, in opposite directions parallel to the film advancing direction. The aperture 22 has half of its area opened and closed by the sliding movements of movable plate 24. As shown in FIG. 7, the movable plate 24 includes a rack 28 at a portion thereof. The rack 28 is meshed with a pinion 29 mounted on the rotary shaft of a stepper motor 30. The stepper motor 30 rotates forward or backward to move the movable plate 24 in the direction in which the film F is advanced or in the direction opposite thereto and set the movable plate 24 in either selected position corresponding to the size of original document S. As a result, the aperture 22 is set in accordance with the original document size.

Figure 8:
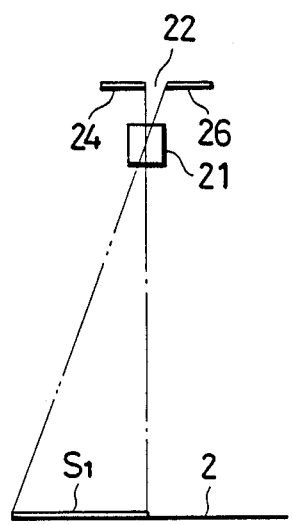
FIG. 8 is a view showing the aperture adjusted to the half size.

FIG. 8 shows the movable plate 24 having been moved in the film advancing direction to the position to close the half area of aperture 22. In this state, the aperture 22 has an amount of opening adjusted to the half size for photographing the original document S1 of a small size such as A4 size.

Figure 9:
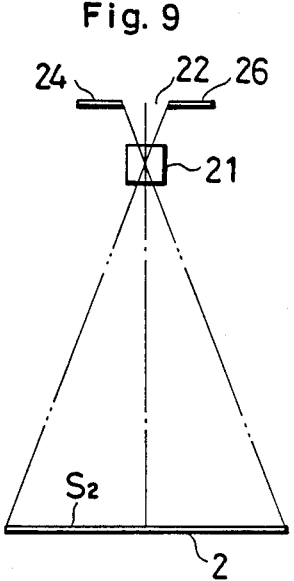
FIG. 9 is a view showing the aperture adjusted to the full size.

FIG. 9 shows the movable plate 24 having been moved in the direction opposite to the film advancing direction to the position to open the half area of aperture 22. In this state, the aperture 22 has an amount of opening adjusted to the full size for photographing the original document S2 of a large size such as A3 size.

The above opening amounts of aperture 22 are set by a document size designating means. As the document size designating means this embodiment employs designating keys provided at the control unit U for designating various document sizes. According to this construction, the operator identifies the size of the document S and presses one of the keys corresponding thereto.

This size designating means provides signals for controlling the direction and amount of rotation of the stepper motor 30 for moving the movable plate 24. The output signals of the size designating means are also used for controlling an amount of film F fed from the supply reel 23 toward the takeup reel 25 when each orginal document S is photographed, an operation of the recording section 8 for recording the document marks D and an operation of the recording section 9 for recording the frame numbers C. Instead of the designating keys as described above, the document size designating means may comprise various other modes. For example, a plurality of sensors may be arranged along the line X on the original board 2, wherein the document size is identified and designated by checking ON-/OFF detection states of these sensors operable in accordance with the document S set in position on the original board 2. Another mode comprises a pulse encoder attached to the feed roller 15 for generating pulses, wherein the document size is identified and designated by counting the pulses only while sensors 31 in FIG. 3 are detecting the document S in passage.

Figure 10:
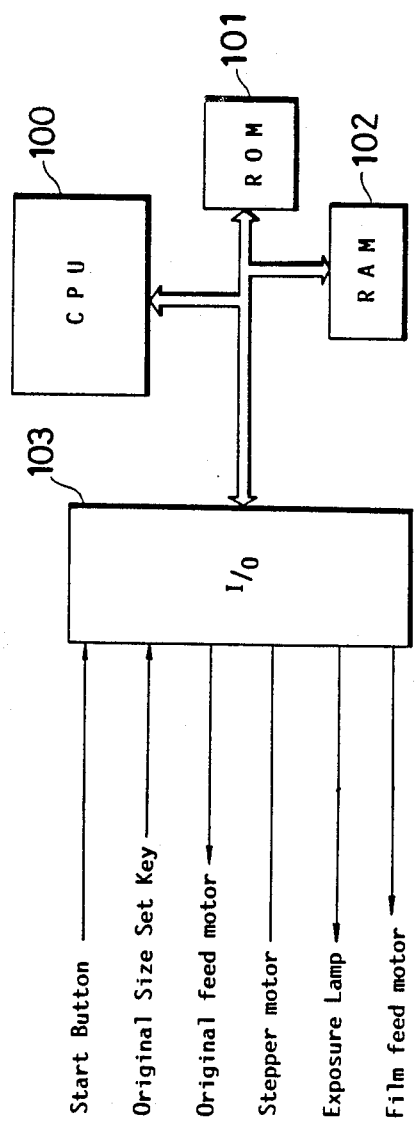
FIG. 10 is a view showing a system for controlling an image photographing operation of the microcamera.

FIG. 10 shows a control system of the described microcamera comprising a CPU 100 acting as its central element, a ROM 101, a RAM 102, and an input and output interface 103. The interface 103 includes input ports for receiving outputs of a start button, the document size designating keys and so on at the control unit A, and output ports for outputting commands to the autofeed mechanism 12, stepper motor 30 and so on.

Figure 11:
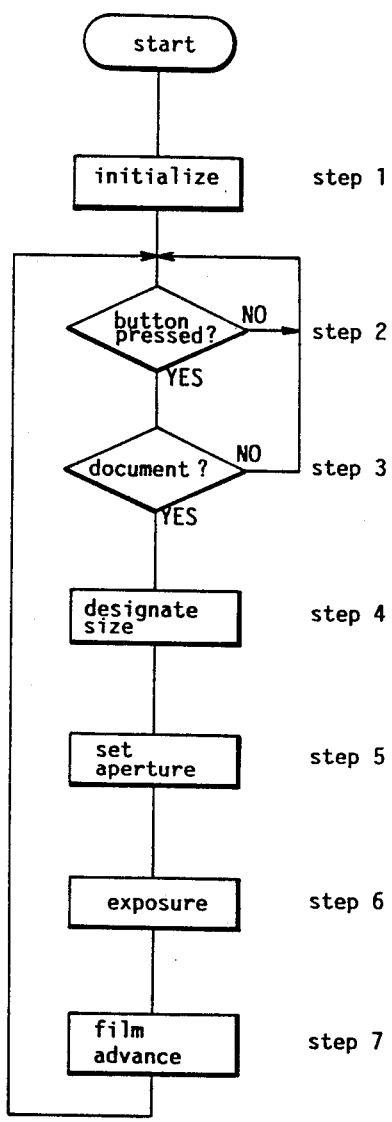
FIG. 11 is a flowchart of the image photographing operation.

FIG. 11 is a flowchart illustrating operation of this control system. With the system initialized at Step 1, the start button at the control unit U is pressed at Step 2 whereupon the original document S is fed from the feed tray 10 to the original board 2. Then the document S is set in position on the original board 2 by adjusting a rear end thereof to lines X and Y. It is confirmed at Step 3 that the document S is in position, and thereafter the original document size is designated at Step 4 which is followed by Step 5 for setting the aperture 22. In other words, the stepper motor 30 is operable in response to the document size designation for moving the movable plate 24 to a predetermined position. This sets the aperture 22 to either the full size or half size thereby forming a projecting area on the film F corresponding to the document size.

Subsequently, at Step 6 the image of the document S on the original board 2 is projected to the film F through the lens 21 and the aperture 22 set as above, which results in a photo image P. Upon completion of the photographing step, the film F is advanced at Step 7 by an amount correspondidng to the size of image P. The original document S having been photographed is automatically discharged by the autofeed mechanism 12 from the original board 2 to the discharge tray 11. The above sequence is repeated each time the start button is pressed.

In this operation, the aperture 22 is set by means of the movable plate 24 defining the end of the aperture 22 opposed to the unexpected side of film F or adjacent the supply reel 23, without ever moving the stationary plate 26 defining the other end of the aperture 22 opposed to the exposed side of film F or adjacent the takeup reel 25.

When the small size document S1 is followed by the large size document S2, the aperture 22 is enlarged by moving its end opposed to the unexposed side of film F with the other end opposed to the exposed side of film F remaining fixed. Therefore, the film F may just be advanced as in normal cases without necessitating an additional feed action to avoid double exposure.

Conversely, when the small size document S1 follows the large size document S2, the aperture 22 is reduced, again, by moving its end opposed to the unexposed side of film F with the other end opposed to the exposed side of film F remaining fixed. Therefore, the film F need not be moved backward to adjust the space between the images P.

All the photographed images P, irrespective of their sizes, are positive images upright transversely of the film F. This permits subsequent retrieval or other operations to be carried out by a reader-printer or the like with great ease.

Thus, the original documents S are photographed on the film F without involving extra processes, with the simplified construction, in an easily controllable manner and within a short processing time.

The original documents S may be set in position on the original board 2 by adjusting the rear end thereof to the lines X and Y on the original board 2 irrespective of their sizes. Therefore, the recording section 8 for recording the document marks D and the recording section 9 for recording the frame numbers C may just be arranged adjacent the lines X and Y, respectively (FIG. 4), without moving these recording sections 8 and 9, to record the document marks D and frame numbers C adjacent one end of each image P (Fig. 5). The document marks D and frame numbers C recorded at fixed positions adjacent one end of the image P provide optimal conditions for retrieval and perusal by the type of reader-printer which adjusts one end of each image P to one side of the screen.

FIG. 13 shows a further embodiment for opening and closing the aperture by means of a solenoid. This construction comprises a latching solenoid 131, a plunger 132 movable right and left in the drawing, a connecting lever 133, a mask plate 134 for providing the half size state, and an aperture plate 135 for defining an aperture 136 corresponding to the full size. Number 137 indicates a film, and number 138 indicates a lens for setting a photographing magnification.

According to this construction, when a voltage is applied to the latching solenoid 131, the plunger 132 moves rightward in the drawing and causes the mask plate 134 to retract from the photographing optical path. Consequently, the aperture 136 is opened to an amount corresponding to the full size. When a voltage is applied to the latching solenoid 131, the plunger 132 moves leftward and causes the mask plate 134 to pivot 90 degrees. This sets the aperture opening to the half size. The righthand half of the aperture closed by the mask plate 134 of course is the side adjacent the supply reel. Since the solenoid 131 is the latching type, it may be electrified only for a moment to switch from the half size to the full size or vice versa. After the power is cut off the plunger is retained in the position to which it has been moved after the power is cut off.

Figure 14:
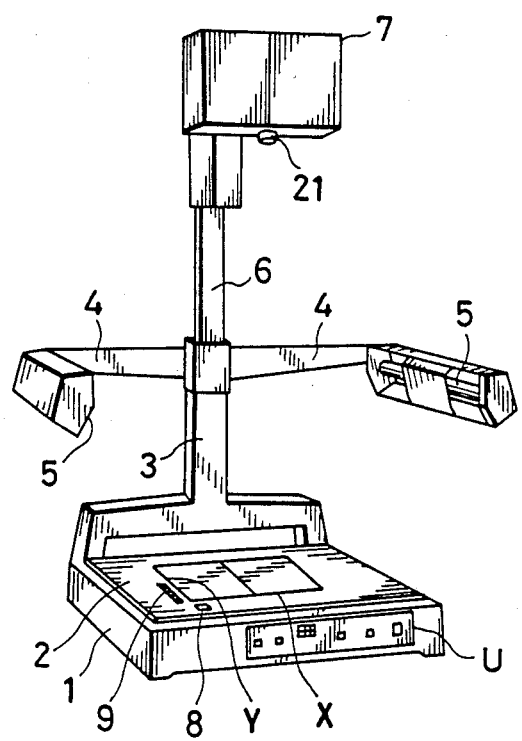
FIG. 14 is a perspective view of a manual type microcamera constituting another example to which the present invention is applicable.

The present invention of course is applicable also to a manual type microcamera without the autofeed mechanism. FIG. 14 shows an outward appearance of a manual type microcamera, in which like reference numbers are affixed to like elements as shown in FIGS. 2 and 3.

Although the present invention has been fully described by way of examples with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. A microfilm camera comprising:
   an original board for supporting an original document;
   a supply reel for supplying a film to be used for recording an image of the original document;
   a takeup reel for taking up the film on which the image of the original document is recorded;
   optical means for projecting the image of the original document on a reduced scale to the film extending between said supply reel and said takeup reel;
   setting means, disposed on a projecting optical path between said original board and said film, for defining an image area of the original document projected on the film by said optical means;
   varying means for varying a width, in a direction of movement of the film, of said image area defined on the film by said setting means, said varying means being operable to vary said width by taking an end of said area adjacent said takeup reel for reference;
   detecting means for detecting the size of the original document; and
   control means for controlling the varying means in accordance with the size of the original document which is detected by said detecting means.

2. A microfilm camera as claimed in claim 1, wherein said optical means includes a projecting lens, said setting means comprises a member for forming an aperture between said projecting lens and said film, and said varying means includes a movable member movable between a position to cover a portion of said aperture and a position retracted from said aperture, and moving means for moving said movable member.

3. A microfilm camera comprising:
   an original board for supporting an original document;
   a supply reel for supplying a film to be used for recording an image of the original document;
   a takeup reel for taking up the film on which the image of the original document is recorded;
   optical means including a projecting lens for projecting the image of the original document on a reduced scale to the film extending between said supply reel and said takeup reel;
   setting means, comprising a member for forming an aperture between said projecting lens and said film, disposed on a projecting optical path between said original board and said film, for defining an image area of the original document projected on the film by said optical means; and
   varying means for varying a width, in a direction of movement of the film, of said image area defined on the film by said setting means, said varying means being operable to vary said width by taking an end of said area adjacent said takeup reel for reference with an end of said area adjacent said supply reel being varied, said varying means including a moveable member moveable between a position to cover a portion of said aperture and a position retracted from said aperture, and a latching solenoid for moving said moveable member.

4. A microfilm camera comprising:
   an original board for supporting an original document;
   a supply reel for supplying a film to be used for recording an image of the original document;
   a takeup reel for taking up the film on which the image of the original document is recorded;
   optical means for projecting the image of the original document on a reduced scale to the film extending between said supply reel and said takeup reel;
   setting means, disposed on a projecting optical path between said original board and said film, for defining an image area of the original document projected on the film by said optical means; and
   varying means for varying a width, in a direction of movement of the film, of said image area defined on the film by said setting means, said varying means being operable to vary said width by taking an end of said area adjacent said takeup reel for reference with an end of said area adjacent said supply reel being varied; and
   means driven by a latching solenoid for varying a magnification ratio.

5. A microfilm camera comprising:
   an original board for supporting an original document;
   a supply reel for supplying a film to be used for recording an image of the original document;

a takeup reel for taking up the film on which the image of the original document is recorded;

optical means for projecting the image of the original document on a reduced scale to the film extending between said supply reel and said takeup reel, said optical means including a projecting lens;

a first light shutting member, disposed on a projecting optical path between said projecting lens and said film and in a position adjacent said takeup reel, for defining an end of the image of the original document projected by said optical means, said end being adjacent said takeup reel;

a second light shutting member, disposed on the projecting optical path between said projecting lens and said film and in a position adjacent said supply reel, for defining another end of the image of the original document projected by said optical means, said another end being adjacent said supply reel and said first and second light shutting members in combination defining an aperture; and moving means for moving said second light shutting member along a direction of movement of said film to vary a width of said aperture in the direction of movement of said film.

6. A microfilm camera as claimed in claim 5, wherein said moving means comprises a latching solenoid.

7. A microfilm camera as claimed in claim 5, further comprising means driven by a latching solenoid for varying a magnification ratio.

8. A microfilm camera comprising:
an original board for supporting an original document;

a supply reel for supplying a film to be used for recording an image of the original document is recorded;

optical means for projecting the image of the original document on a reduced scale on the film extending between said supply reel and said takeup reel, said optical means including a projecting lens;

a first light shutting member disposed on a projecting optical path between said projecting lens and said film for defining an image area of the original projected on the film by said optical means, said first light shutting member including an aperture through which the image of the original document is to be projected on the film;

a second light shutting member movable between a first position to cover a half of said aperture adjacent said supply reel and a second position retracted from said aperture; and moving means for moving said second light shutting member between said first and second positions.

9. A microfilm camera as claimed in claim 8, wherein said moving means comprises a latching solenoid.

10. A microfilm camera as claimed in claim 8, further comprising means driven by a latching solenoid for varying a magnification ratio.

11. A microfilm camera comprising:
an original board for supporting an original document;

a supply reel for supplying a film to be used for recording an image of the original document;

a takeup reel for taking up the film on which the image of the original document is recorded;

optical means for projecting the image of the original document on a reduced scale to the film extending between said supply reel and said takeup reel, said optical means including a projecting lens;

a first light blocking member, disposed on a projecting optical path between said projecting lens and said film and in a position adjacent said takeup reel, for defining an end of the image of the original document projected by said optical means, said end being adjacent said takeup reel;

a second light blocking member, disposed on the projecting optical path between said projecting lens and said film and in a position adjacent said supply reel, for defining another end of the image of the original document projected by said optical means, said another end being adjacent said supply reel and said first and second light blocking members in combination defining an aperture;

moving means for moving said second light blocking member along a direction of movement of said film to vary a width of said aperture in the direction of movement of said film;

detecting means for detecting the size of the original document; and control means for controlling the moving means in accordance with the size of the original document which is detected by said detecting means.

12. A microfilm camera comprising:
an original board for supporting an original document; a supply reel for supplying a film to be used for recording an image of the original document;

a takeup reel for taking up the film on whch the image of the original document is recorded;

optical means for projecting the image of the original document on a reduced scale to the film extending between said supply reel and said takeup reel, said optical means including a projecting lens;

a first light blocking member disposed on a projecting optical path between said projecting lens and said film for defining an image area of the original document projected on the film by said optical means, said first light shutting member including an aperture through which the image of the original document is to be projected on the film;

a second light blocking member moveable between a first position to cover a half of said aperture adjacent said supply reel and a second position retracted from said aperture;

moving means for moving said second light blocking member between said first and second positions;

detecting means for detecting the size of the original document; and control means for controlling the moving means in accordance with the size of the original document which is detected by said detecting means

* * * * *